June 21, 1949.　　　J. SLEPIAN ET AL　　　2,473,915
HEATING AND WELDING SYSTEM
Filed June 21, 1941　　　　　　　　　　　　　　　6 Sheets-Sheet 1

WITNESSES:
la J. Weller.
F. V. Giolma

INVENTORS
Joseph Slepian and
Alfred B. White.
BY
Crawford
ATTORNEY

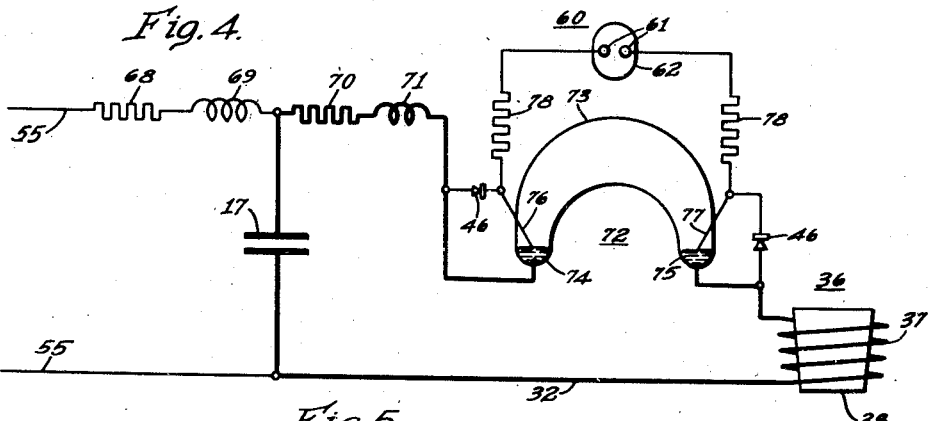
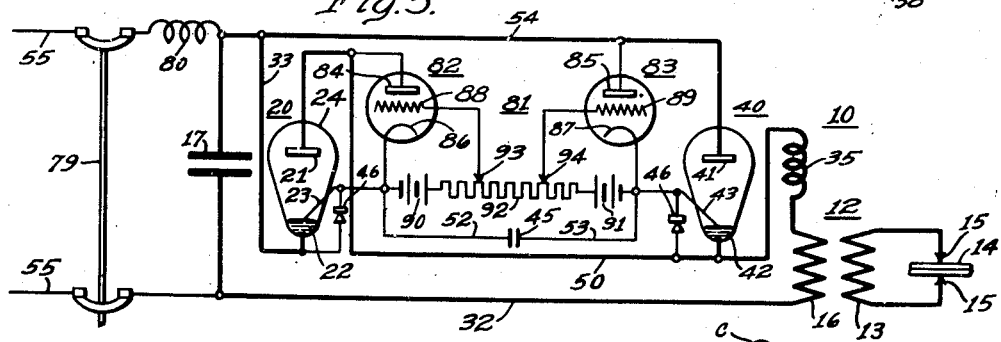
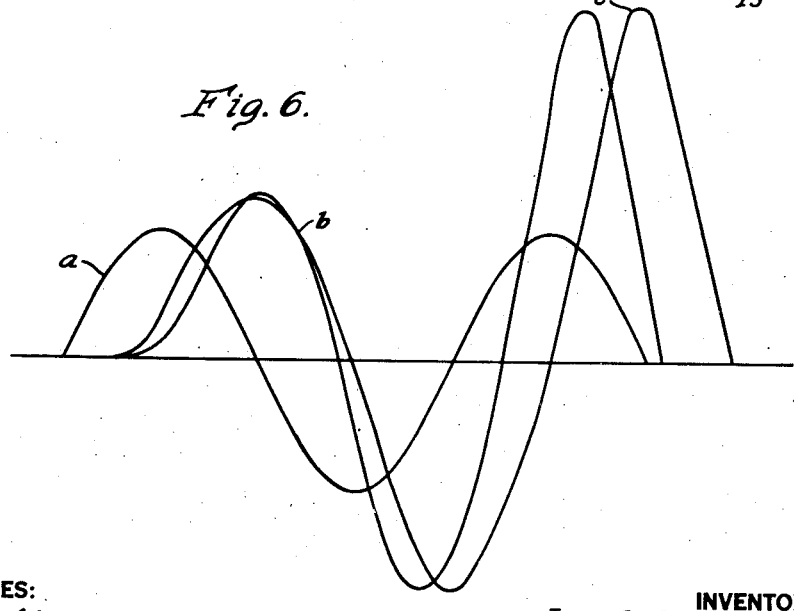

June 21, 1949.  J. SLEPIAN ET AL  2,473,915
HEATING AND WELDING SYSTEM
Filed June 21, 1941  6 Sheets-Sheet 3

WITNESSES:
C. J. Weller.
F. V. Giolma

INVENTORS
Joseph Slepian and
Alfred B. White.
BY
ATTORNEY

June 21, 1949.    J. SLEPIAN ET AL    2,473,915
HEATING AND WELDING SYSTEM
Filed June 21, 1941    6 Sheets-Sheet 5

WITNESSES:
C. J. Weller.
P. V. Giolma

INVENTORS
Joseph Slepian and
Alfred B. White
BY
G. M. Crawford
ATTORNEY

June 21, 1949.  J. SLEPIAN ET AL  2,473,915
HEATING AND WELDING SYSTEM
Filed June 21, 1941  6 Sheets-Sheet 6

WITNESSES:
C. J. Weller.
G. D. Giolma

INVENTORS
Joseph Slepian and
Alfred B. White.
BY
Crawford
ATTORNEY

Patented June 21, 1949

2,473,915

UNITED STATES PATENT OFFICE 2,473,915

HEATING AND WELDING SYSTEM

Joseph Slepian, Pittsburgh, and Alfred B. White, Edgewood, Pa., assignors to Westinghouse Electric Corporation, East Pittsburgh, Pa., a corporation of Pennsylvania Application June 21, 1941, Serial No. 399,084

27 Claims. (Cl. 320—1)

Our invention relates, generally, to energy translating systems, and it has reference, in particular to heating and welding systems.

It is an object of our invention to provide a simple, tractable, and efficient relatively high frequency welding or heating system which shall be inexpensive to construct.

Another object of our invention is to provide apparatus for welding a material by supplying discrete impulses to the material during selected half periods of an alternating current source.

A more general object of our invention is to provide apparatus of simple structure for supplying power to an inductive load circuit.

Another general object of our invention is to provide voltage responsive apparatus for supplying power to a load circuit.

A further general object of our invention is to provide apparatus for supplying oscillatory power to an inductive load circuit at spaced time intervals.

A still further general object of our invention is to provide apparatus for transferring energy at a high rate from a source to a load without draining the energy from the source at an appreciable rate.

Still another general object of our invention is to provide simple, tractable, and inexpensive apparatus for supplying variable power to an inductive load.

A specific object of our invention is to provide a spot or seam welder in which the welding current is oscillatory having a frequency substantially higher than commercial frequency.

Another specific object of our invention is to provide an interrupted spot welder of simple and inexpensive structure.

A further specific object of our invention is to provide a novel arrangement for controlling valve means, particularly of the ignitron type.

Still another specific object of our invention is to provide a welding system for resistance or arc welding having an inductive welding circuit in which the welding current shall be oscillatory and of a frequency substantially larger than the commercial frequency of 60 cycles per second.

Other objects will, in part, be obvious and will, in part, appear hereinafter.

In its broader aspects, our invention applies to an inductive load; specifically, it applies to an induction heater or a welder. In accordance with our invention, the load is connected to a condenser source of stored electrical energy, which is energized from a suitable source, in such manner as to discharge the condenser into the inductive load circuit at predetermined intervals. Thus, a high energy impulse or a relatively high frequency oscillating current is produced in the load circuit. The condenser is discharged through valve means which is set to conduct when the condenser voltage reaches a predetermined value.

In accordance with a further aspect of our invention the condenser may be discharged at spaced intervals as determined by preset peak values of condenser voltage which increase as the condenser is charged to the value at which the load current flows. The condenser may be charged relatively slowly. If the load circuit is such that the condenser-load network has a relatively high natural frequency the condenser may be discharged into the load circuit rapidly so that the rate of energy transfer to the load is high while the rate of energy drain from the source is inappreciable.

Specifically, our invention is applicable to spot and seam welding. The charged condenser is, in this case, discharged through the welding circuit at timed intervals and produces intermittent relatively high frequency oscillatory welding impulses or single current impulses. The charged condenser may be connected to the welder, or to any inductive load for that matter, at selected points in waves of the source potential or of the condenser potential and thus the welding current may be adapted precisely to the material to be welded. By proper adjustment of valve means in the charging or discharging circuit of the condenser the charge and discharge of the condenser may be repeated for each weld and in this manner an interrupted spot welding system of simple structure may be produced.

The valve means in the condenser circuit may be controlled from the condenser potential through a low pressure voltage gap and a control device having a relatively low impedance to current of the resonant frequency of the discharge circuit.

Briefly then, our invention involves an inductive load circuit such as a spot or seam welding circuit, or an induction heating circuit energized by means of relatively high frequency impulses from a condenser, which acts as a source of stored electrical energy. The condenser may be charged from a suitable source of direct or alternating current power through an impedance which prevents the source from supplying an appreciable amount of power directly to the welding or heating circuit. The connection of the welding or heating circuit to the condenser may be controlled by valve means of the arc discharge type through a control circuit which renders the valve means conductive in accordance with predetermined conditions of the condenser voltage. The time of connection may be varied with respect to either the voltage wave of the source or of the condenser to vary the amount of the charge or any effect of the resulting high frequency discharge on the source. When the condenser is connected to the welding or inductive heating circuit which is provided with sufficient inductance to provide a natural circuit frequency which is relatively high, relatively high frequency oscillations are produced in the welding or heating circuit so that heat energy may be supplied to an article being heated or welded by means of the relatively high frequency current impulses.

For a more complete understanding of the nature and scope of our invention, reference may be had to the following detailed description, which is to be taken in connection with the accompanying drawings, in which:

Fig. 4 is a diagrammatic view of an induction heating system embodying a modification of the invention;

Fig. 5 is a diagrammatic view of a spot or seam welding system embodying another modification of the invention;

Fig. 6 shows curves illustrating the operation of the welding systems shown in Fig. 5;

Figure 1:
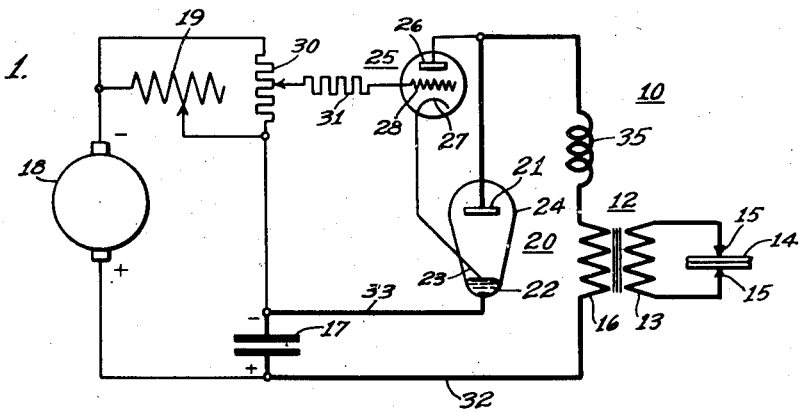
Figure 1 is a diagrammatic view of a welding system embodying features of the invention.

Referring to Figure 1 of the drawings, the reference numeral 10 may denote, generally, a welding circuit wherein a welding transformer 12 is utilized to supply a relatively low voltage welding current through the secondary winding 13 to work 14 which is positioned between the electrodes 15.

In order to supply a relatively large amount of electrical energy to the primary winding 16 of the transformer 12 during a relatively short interval, suitable means, such as the condenser 17, may be provided. The condenser 17 may be energized from any suitable source of electrical energy such as, for example, the direct current generator 18. An impedance 19 may be connected in series circuit relation with generator 18 and the condenser 17 to limit the current supplied by the source 18 so as to prevent it from supplying electrical energy directly to the primary winding 16 of the transformer 12 at any appreciable rate when it is connected to the condenser 17.

With a view to providing for connecting the primary winding 16 of the transformer 12 to the condenser 17 under predetermined conditions to provide a discharge circuit therefor, valve means may be provided, such as, for example, the arc discharge device or valve 20. The valve 20 may be of any suitable type, being, for example, provided with an anode 21, a mercury pool cathode 22, and a control electrode or igniter 23 positioned within a suitable casing 24 in a manner well known in the art.

In order to provide for applying a control voltage to the control electrode or igniter 23 to render the valve 20 conductive under predetermined conditions, suitable control means, such as the gaseous discharge device 25, may be utilized. The gaseous discharge device may be of any suitable type comprising, for example, a cathode 27 which may be heated by connection to any suitable source of electrical energy, an anode 26 and a control grid 28.

With a view to rendering the gaseous discharge device 25 non-conductive until the charge on the condenser 17 reaches a predetermined value, suitable means may be provided for applying a negative bias voltage to the control grid 28 until such time as the charge of the condenser 17 reaches the predetermined value. Since the charging current through the impedance 19 will be reduced to substantially zero as the charge of the condenser 17 reaches a maximum, a voltage potentiometer 30 may be connected across the impedance 19 to provide the desired negative bias voltage on the control grid 28. A protective grid resistor 31 may be provided to limit the grid current.

When the condenser 17 is initially connected to the generator 18, the drop across the impedance 19 is relatively high due to the flow of charging current therethrough, and as a result, a relatively high negative bias voltage is applied to the grid 28 of the gaseous discharge device 25 from the potentiometer 30. The gaseous discharge device 25 is thus rendered non-conductive, so that the arc discharge device 20 effectively disconnects the primary winding 16 of the welding transformer 12 from the condenser 17. As soon as the charge on the condenser 17 reaches a predetermined value, the voltage drop across the impedance 19 is reduced to a predetermined value, so that the negative bias voltage on the control grid 28 is reduced sufficiently to render the gaseous discharge device 25 conductive.

An energizing circuit for the igniter 23 is thus provided from the positive terminal of the condenser 17, through the conductor 32, the primary winding 16 of the welding transformer 12, the gaseous discharge device 25, the igniter 23, mercury cathode 22 and conductor 33 to the negative terminal of the condenser.

The arc discharge device 20 is thus rendered conductive, permitting the condenser 17 to discharge through the primary winding 16 of the welding transformer so as to produce a relatively high current impulse in the secondary winding 13 thereof during a relatively short interval, for effecting a welding of the work 14.

As soon as the arc discharge device 20 becomes conductive, the voltage between the plate 26 and cathode 27 of the gaseous discharge device 25 is reduced to the arc drop between the anode 21 and cathode 22 of the arc discharge device 20. As soon as the condenser 17 begins to discharge, current commences to flow through the impedance 19 from the source 18 and a negative bias voltage from the impedance 19 is automatically applied to the control grid 29 through the potentiometer 30, so that the gaseous discharge device 25 becomes non-conductive. The igniter 23 of the arc discharge device is deenergized, and current continues to flow through the arc discharge device until the current drops to a value below the predetermined minimum required to maintain the device conductive, when it ceases to conduct. The primary winding 16 of the welding transformer 12 is disconnected from the condenser 17, which may then recharge from the generator source 18 so as to repeate the cycle hereinbefore described. Should current tend to flow from the source 18 through the arc discharge device, the reverse current oscillation from the condenser 17 will oppose this tendency and permit the device to become non-conductive.

Since the inductance of the welding transformer may be determined by characteristics of the transformer, and sufficient inductance may not be provided by the transformer alone to produce a discharge circuit for the condenser 17 having the desired natural frequency, an external inductance 35 may be inserted in the discharge circuit of the condenser to produce the desired characteristics in the circuit. The condenser may thus be charged over a relatively long interval and discharged during a relatively short interval. Relatively steep wave front current waves may thus be produced to supply relatively large amounts of electrical energy to the welding circuit in relatively short intervals, without effecting a serious drain of energy from the source 18.

Figure 2:
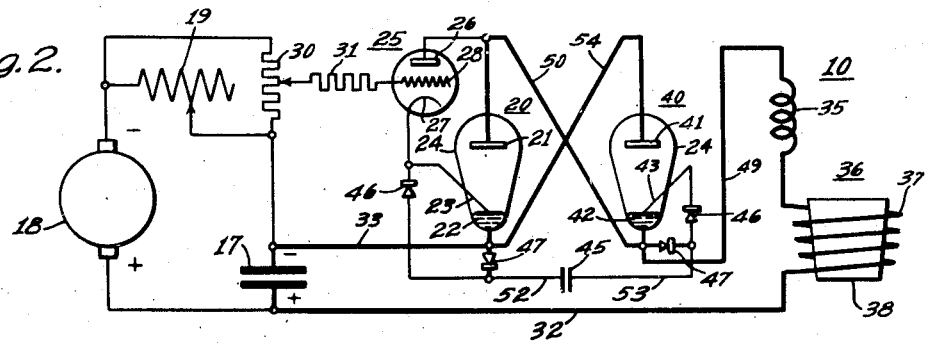
Fig. 2 is a diagrammatic view of an induction heating system embodying the principal features of the invention.

Referring to Fig. 2, it will be seen that an induction heating furnace 36 comprising an induction coil 37 and a cupola 38 for receiving a charge to be heated may comprise the discharge circuit of the condenser 17 instead of the welding transformer 12, as shown in Fig. 1. The condenser 17 may be connected to the source 18 through an impedance 19 in a manner similar to that shown and described in connection with Fig. 1 of the drawings.

Instead of utilizing a single arc discharge valve or device 20 and associated gaseous discharge device 25 for connecting the discharge circuit, including the induction heating furnace to the condenser for single periodic impulses of electrical energy, an additional valve or arc discharge device 40 having an anode 41, mercury pool cathode 42 and igniter 43 may be provided. The two valves or arc discharge devices 20 and 40 are, in this instance, connected in the well known anti-parallel, back-to-back, or inverse relation so as to provide for conducting current from the condenser 17 through the circuit of the induction coil 37 in both directions, instead of in one direction only as in Fig. 1. The condenser may then be arranged to discharge in opposite directions through the induction coil and set up relatively high frequency oscillations therein.

A gaseous discharge device 25 may be utilized for applying a control voltage to the igniter 23 of the valve or arc discharge device 20 to initially render it conductive, in a manner similar to that described in connection with Fig. 1. In order to provide for rendering the valves or arc discharge devices 20 and 40 selectively conductive subsequently, to permit high frequency oscillations to be produced by the alternate discharging and charging of the condenser 17 through the inductive load circuit including the induction coil 37 and the auxiliary inductance 35, suitable means may be provided for supplying current to the igniters 23 and 43 of the two valves or arc discharge devices. For example, an auxiliary condenser 45 may be utilized to pass a high frequency igniting current from the discharge circuit through the igniters 23 and 43. For the purpose of preventing back voltages being applied to the igniters 23 and 43 when the current oscillations in the discharge circuit are in reverse directions to that for which their respective devices conduct, rectifier devices 46 and 47 may be provided to protect the igniters.

When the condenser 17 is initially connected to the generator 18 for charging, a negative bias voltage is applied to the control grid 28 of the gaseous discharge device 25 from the potentiometer 30 because of the voltage drop across the impedance 19 caused by the charging current. When the charge on the condenser 17 reaches a predetermined value, the voltage drop across the impedance 19 is reduced to a predetermined value, so that the negative bias voltage applied to the control grid 28 is reduced sufficiently to render the gaseous discharge device 25 conductive. Voltage is then applied from the condenser 17 to the igniter 23 through the circuit extending from the positive terminal of the condenser 17, conductor 32, the induction coil 37, auxiliary inductance 35, conductor 49, conductor 50, anode 26 and cathode 27, of the gaseous discharge device 25, igniter 23 and mercury pool cathode 22 of the arc discharge device 20, and conductor 33 to the negative side of the condenser. The arc discharge device 20 is rendered conductive, and the condenser 17 discharges through the induction coil 37, auxiliary inductance 35, conductor 49, arc discharge device 20, and conductor 33, to the other terminal of the condenser 17.

The condenser is thus charged in the opposite direction and the arc in ignitron 20 extinguishes. The auxiliary condenser 45, which is connected between the igniters 23 and 43 provides a relatively low impedance for the sharp wave front potential impressed from the condenser 17 after the arc extinguishes in the arc discharge device 20. What happens here is that a potential suddenly appears across the condenser 45 when ignitron 20 becomes non-conductive. The latter event occurs when the capacitor 17 is charged to its maximum potential and constitutes the only potential source in the network 17—33—20—50—49—35—37—32. At the instant when the ignitron 20 becomes non-conductive the whole capacity potential is impressed across the anode and cathode of the ignitron (since the ignitron anode-cathode capacity is small). The anode is connected to one terminal of condenser 45 and the cathode to the other.

A relatively sharp impulse of exciting current is thus applied to the igniter 43 through the circuit extending from the now positive terminal of the condenser 17 through the conductor 33, rectifier device 47, conductor 52, auxiliary condenser 45, conductor 53, rectifier device 46, igniter 43, mercury pool cathode 42, conductor 49, auxiliary inductance 35, induction coil 37 and conductor 32 to the other terminal of the condenser 17. The arc discharge device 40 is thus rendered conductive, and the condenser 17 re-discharges through the induction coil 37 in the reverse direction through the circuit extending from the conductor 33, conductor 54, arc discharge device 40, conductor 49, auxiliary inductance 35, induction coil 37, and conductor 32 to the other terminal of the condenser 17.

Due to the absorption of electrical energy in heating the work in the cupola 38 and overcoming the impedance of the discharge circuit, the amplitude of the oscillations of the relatively high frequency current in the discharge circuit may gradually reduce. If no provision is made for balancing the rate of supply of electrical energy to the condenser 17 from the source 18 against the rate of energy absorption in the discharge circuit, periodic oscillatory discharges of the condenser may result. The condenser 17 under these conditions continues to discharge in opposite directions, at a relatively high frequency once the discharge of the condenser is initiated, until the voltage across the condenser is reduced to such a value that the high frequency current provided to the igniters 23 and 43 through the auxiliary condenser 45 becomes insufficient to render the valves 20 and 40 conductive. Under these conditions, valves 20 and 40 become nonconductive and the condenser 17 is disconnected from the induction coil 37 so that it may be recharged from the generator source 18. The sequence will be repeated when the voltage of the condenser 17 against reaches the predetermined value at which the negative bias voltage on the grid of the gaseous discharge device 25 is reduced sufficiently to render the device conductive.

By properly balancing the rate of energy input from the generator source 18 through adjusting the impedance 19 with the rate of energy absorption in the discharge circuit including the induction winding 37, sustained oscillations of relatively high frequency may be maintained in the discharge circuit.

Figure 3:
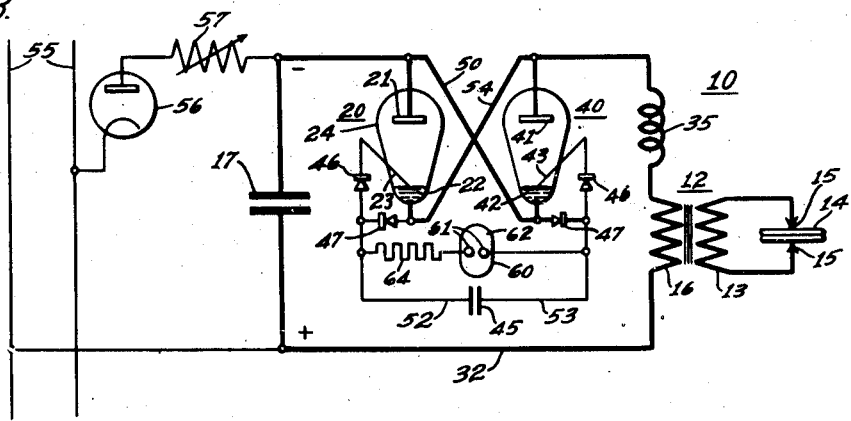
Fig. 3 is a diagrammatic view of a spot or seam welding system embodying a modification of the invention.

Referring to Fig. 3, the reference numeral 55 may denote conductors connected to a source of alternating current. Valve means of any suitable type, such as the rectifier device 56, may be connected between the conductors 55 and the condenser 17 in series circuit relation with a variable impedance 57 for controlling the charging rate of the condenser. The primary winding 16 of the welding transformer 12 may be connected to the condenser 17 by valves or arc discharge devices 20 and 40 connected in inverse relation in a similar manner to that described in connection with Fig. 2.

Instead of utilizing a gaseous discharge device of the type shown in Fig. 2 for initiating the conductivity of the valves or arc discharge devices in response to predetermined conditions of condenser voltage, means such as the low pressure gap 60, such as is disclosed in Patent No. 2,326,074 to Joseph Slepian, dated August 3, 1943 and assigned to Westinghouse Electric & Manufacturing Company, may be used. The gap 60 may also be an open air spark gap. The gap 60 may be of any suitable type such as, for example, has been developed for the protection of capacitors installed on transmission lines. For example, the gap may comprise a pair of spaced electrodes 61 positioned in predetermined relation within a casing 62, wherein the pressure may be reduced to a relatively low value so as to permit a glow discharge between the electrodes when a relatively low voltage of a predetermined value is applied thereto. The low pressure gap 60 may, for example, be connected between the igniters 23 and 43 in parallel relation to the auxiliary condenser 45.

When the voltage across the condenser 17 reaches a predetermined value, the low pressure gap 60 breaks down, since it is connected across the condenser 17 through the circuit extending from the positive terminal of the condenser through the conductor 32, the primary winding 16 of the welding transformer 12, the auxiliary inductance 35, conductor 54, rectifier device 47, resistor 64, low pressure gap 60, rectifier device 46, igniter 43 and conductor 50 to the negative terminal of the condenser.

The arc discharge device 40 is thus rendered conductive and the condenser 17 discharges therethrough and through the primary winding 16 of the welding transformer inducing an impulse of welding current in the secondary winding 13, charging the condenser 17 in the opposite direction to which it was originally charged. Since the auxiliary condenser 45 provides a relatively low impedance path for the sharp wave front potential, which abruptly appears across the condenser 45 when the arc extinguishes, the igniter 23 of the valve or arc discharge device 20 is energized by a relatively sharp current impulse supplied thereto through the auxiliary condenser 45 and the circuit described in connection with Fig. 2. The valve or arc discharge device 20 becomes conductive and the condenser 17 discharges again through the primary winding 16, this time through the arc discharge device 20, recharging again in the original direction. Successive relatively high frequency impulses of electrical energy may thus be provided in opposite directions in a relatively short period through the primary winding 16 of the welding transformer 12 to induce relatively high frequency welding currents in the secondary winding 13 thereof for welding the work 14 positioned between the electrodes 15.

The valves 20 and 40 may also be supplied with firing current repeatedly through the gap 60 rather than through the capacitor 45. For this purpose the gap must be properly selected. In the event that the firing of the valves is through the gap the capacitor 45 may be omitted.

In the Fig. 3 embodiment the capacitor 17 may also be supplied directly from the source 55 rather than through a rectifier (56). This modification of our invention is particularly useful in cases in which the capacitor 45 is not used and the load decrement is such that the reversed potential impressed on the condenser 17 after the first discharge of the condenser is insufficient to break down the gap 60. In such an event a single impulse flows through one of the valves 20 or 40 during each half period of the source 55. During the succeeding half period the condenser 17, having been discharged, is recharged to the opposite polarity and discharges through the other valve (40 or 20). In this modification the constants of the load circuit should be such that the energy stored in the condenser 17 during each charging operation is substantially completely absorbed during the discharging operation so that the inverse potential impressed on the capacitor 17 during the discharging operation is relatively small.

Referring to Fig. 4, it will be seen that the condenser 17 may be connected to a source of alternating current by means of conductors 55. An impedance may be provided for limiting the charging current to the condenser from the source and providing an oscillatory charging circuit therefor, such as, for example, the resistor 68 and inductance 69. A resistor 70 and an inductance 71 may be utilized in the discharge circuit to control the amplitude and frequency of the oscillations produced therein by discharging the condenser 17 therein.

Induction heating apparatus 36 comprising, for example, an induction coil 37 and a cupola 38 positioned therein for receiving a charge to be melted, may be connected to the condenser 17 by valve means 72.

Instead of utilizing as valve means independent arc discharge devices of the type hereinbefore described in connection with Figs. 1 through 3, we propose to combine the arc discharge devices into a single valve device of the arc discharge type having, for example, an inverted U-shaped casing 73 with mercury pools 74 and 75 at the lower ends of the legs which function as anodes and cathodes alternately, depending on the instantaneous polarity of the applied voltage, and control electrodes or igniters 76 and 77, respectively. A small quantity of a foreign gas such as argon may be introduced into the casing to insure quick pick up when the mercury vapor pressure is low.

In order to provide for initiating operation of the valve means 72 and maintaining it conductive thereafter, suitable means such as, for example, the low pressure discharge gap 60 may be provided. Rectifier devices 46 may be provided as hereinbefore explained, to by-pass any back voltages which might otherwise be applied to the igniters. Resistors 78 may be provided to limit the current through the low pressure gap 60.

When the condenser voltage reaches a predetermined value, the low pressure gap 60 breaks down, applying a positive voltage to either of the igniters 76 or 77, depending on which terminal of the condenser is positive. For example, the circuit may extend from one terminal of the condenser 17, through resistor 70, impedance 71, rectifier device 46, resistor 78, gap 60, resistor 78, igniter 77, mercury pool 75, induction coil 37, and conductor 32 to the other terminal of the condenser. This renders the valve means 72 conductive in a direction from the positive to negative terminal or from the mercury pool 74 to the mercury pool 75, thus discharging the condenser 17 through the coil 37 of the induction heating apparatus and charging the condenser 17 in the opposite direction. The low pressure gap 60 breaks down again under the high frequency voltage produced, applying a positive voltage to the other of the igniters and rendering the switch device 72 conductive in the opposite direction. This sequence continues for successive high frequency oscillations produced by discharging the condenser 17 through the inductive load circuit, maintaining a relatively high frequency load current through the induction winding 37 until the condenser voltage falls below the value required to break down the gap 60, when the condenser will be recharged from the source. As the oscillatory discharges of the condenser are of a relatively high frequency, many such discharges may occur in a single half cycle of the source if the condenser is connected to the usual 60 cycle source. On the next half cycle the condenser will be charged in the reverse direction and a similar sequence results.

Referring to Fig. 5, the numerals 55 denote generally conductors connected to a suitable source of alternating current energy. A switch device 79 may serve to connect the condenser 17 to the conductors 55 through an inductance 80, which may be designed so as to provide a charging circuit for the condenser which is resonant or which approaches resonance so as to be oscillatory, having, for example, an inductive reactance equal to approximately one-half of the capacitative reactance of the condenser 17.

Valve means 81, comprising, for example, the arc discharge devices 20 and 40, which are connected in inverse relation may be provided for connecting the condenser 17 and the primary winding 16 of the welding transformer 12 as hereinbefore described. Suitable control means, such as the gaseous discharge devices 82 and 83, having anodes 84, 85, cathodes 86, 87, and control grids 88, 89 may be provided for applying control voltages to the igniters 23 and 43 of the arc discharge devices 20 and 40, respectively, to render them conductive.

Since the inductive reactance of the charging circuit for the condenser 17 is approximately half the capacitative reactance of the condenser, the natural frequency of the charging circuit will be $\sqrt{2}$ times the frequency of the source, and as a result the voltage wave of the condenser will be oscillatory in the general manner shown in Fig. 6, wherein the curve $a$ indicates the fundamental voltage wave of the source and $b$ indicates the voltage wave of the condenser. It will be seen that the voltage wave $b$ of the condenser 17 reaches successively higher peaks in the first several half cycles, each in excess of the voltage of the source.

By rendering the gaseous discharge devices 82 and 83 normally non-conductive, and rendering them conductive only when the condenser voltage reaches a relatively high value, such as indicated by the point $c$ on curve $b$ in Fig. 6, it is possible to obtain intermittent energization of the igniters 23 and 43 to render the arc discharge devices 20 and 40 conductive only, for example, on every third half cycle of the condenser voltage wave. Intermittent discharges of the condenser of alternately opposite polarities may thus be provided, since the arc discharge devices 20 and 40 are rendered conductive only on odd spaced half cycles of the condenser voltage wave. They will conduct on positive and negative half cycles of the condenser voltage wave alternately. By thus using alternate positive and negative half cycles of the condenser voltage wave, saturation of transformer cores in the welding and/or charging circuits is prevented, since the cores of any transformers will be energized with substantially an equal number of positive and negative half waves during a given interval, thus preventing the production of a direct current component in either the charging or discharging circuits.

In order to render the gaseous discharge devices 82 and 83 normally non-conductive, so as to utilize this selective discharging of the condenser, means such as the batteries 90 and 91 may be provided for normally applying negative bias voltages to the control grids 88 and 89, respectively, of the devices. By utilizing a control resistor 92 having adjustable contact members 93 and 94 to superimpose on the grids 88 and 89 a voltage proportional to the condenser voltage which is impressed between the cathodes 22 and 42 of the arc discharge devices, the voltage on the grids 88 and 89 may be varied in response to the voltage of the condenser 17. When the condenser voltage reaches a sufficiently high value to overcome the negative bias voltage applied to either of the grids by the batteries 90 or 91, the gaseous discharge device is rendered conductive, and the arc discharge device controlled thereby conducts, connecting the condenser 17 to the primary winding 16 of the welding transformer.

When the condenser 17 is connected to the conductors 55 by closing the switch 79, the voltage across the condenser will vary generally as illustrated by the curve b in Fig. 6. The batteries 90 and 91 normally apply negative bias voltages to the grids 88 and 89, respectively, rendering the gaseous discharge devices 82 and 83 non-conductive. An alternating current voltage proportional to the condenser voltage is superimposed on the grids 88 and 89, from the resistor 92, through the contact members 93 and 94, since the control resistor 92 is connected across the condenser 17 through the circuit extending from one terminal of the condenser through the conductor 32, primary winding 16 of the welding transformer 12, auxiliary inductance 35, rectifier device 46, battery 91, control resistor 92, battery 90, igniter 23, cathode 22 and conductor 33 to the other terminal of the condenser 17. If the upper terminal of the condenser is momentarily positive, the voltage drop in the resistor 92 renders the control grid 88 more negative, and overcomes the negative bias of the battery 91, reducing the negative voltage bias on the control grid 89 sufficiently to render the gaseous discharge device 83 conductive. The condenser voltage is applied to the igniter 43 through the gaseous discharge device 83, and the arc discharge device 40 becomes conductive. The condenser 17 is discharged through the primary winding 16 of the welding transformer 12 charging the condenser in the opposite direction. The auxiliary condenser 45 passes sufficient of the high frequency oscillating discharge current to energize the igniter 23 and render the arc discharge device 20 conductive. An oscillatory discharge results, as hereinbefore described, producing relatively large oscillatory welding currents during the remainder of the half cycle during which the discharge was initiated. Since the condenser voltage is not sufficiently high to overcome the negative bias voltage applied to the control grid 88 until the third half-cycle after the condenser 17 is discharged through the arc discharge device 40, the arc discharge devices will both remain non-conductive during this interval after the high frequency oscillatory discharge. When the condenser voltage again reaches the predetermined value, this time in the negative direction, the negative bias on the control grid 88 of the gaseous discharge device 82 is overcome, and the arc discharge device 20 is rendered conductive to discharge the condenser in the opposite direction and effect a plurality of relatively high frequency discharges during a single half cycle of the condenser voltage. A plurality of intermittent oscillatory discharges of the condenser 17 of opposite polarity may thus be obtained while the switch 79 remains closed.

Figure 7:
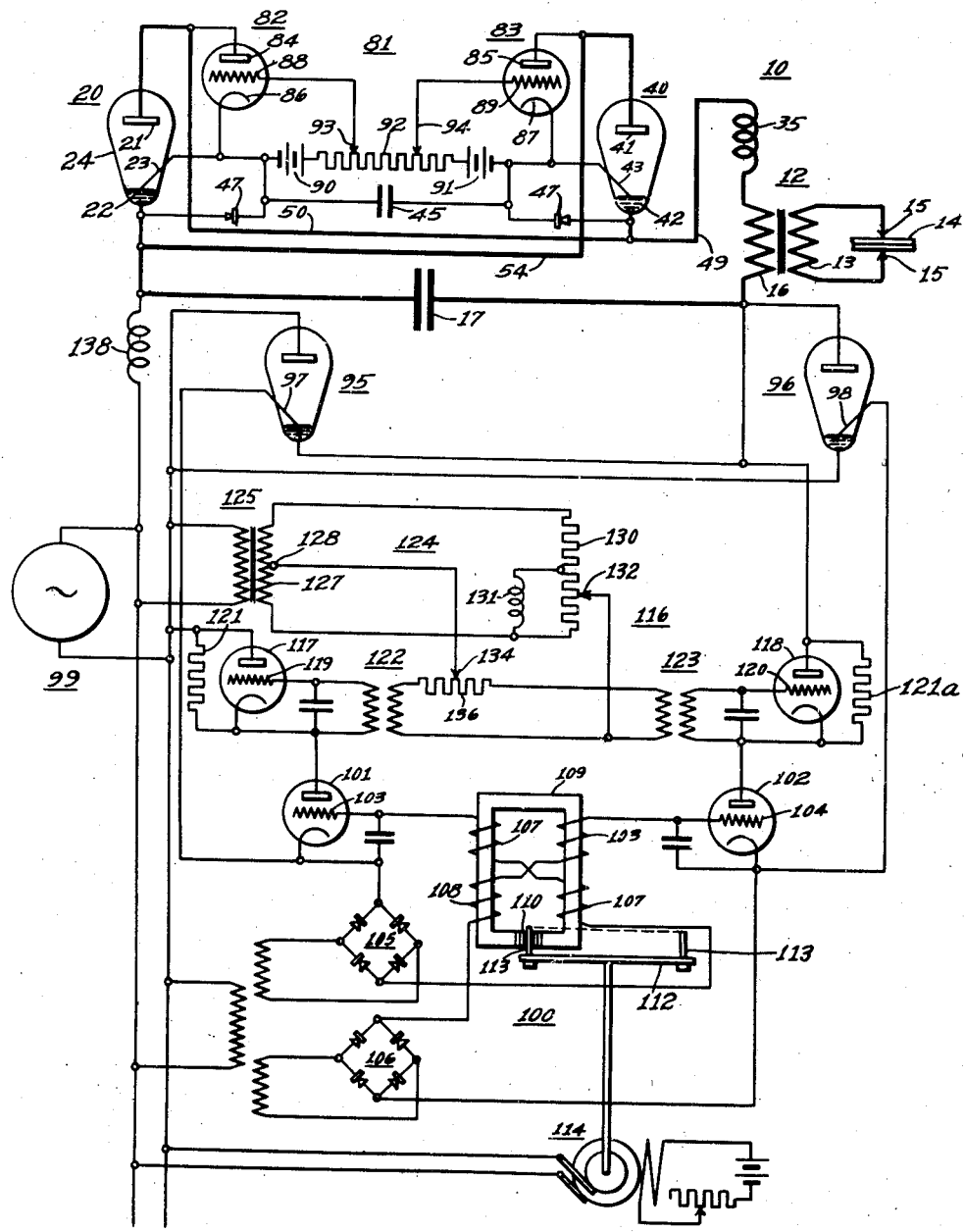
Fig. 7 is a diagrammatic view of a welding system illustrating a further modification of the invention.

Referring to Fig. 7, the reference numeral 10 may, as heretofore, denote generally a welding circuit including a welding transformer 12 having a secondary winding 13 for applying welding current to the work 14 to be welded through the electrodes 15, and a primary winding 16. Suitable valve means 81 may be provided for connecting the primary winding 16 and the welding circuit 10 to the condenser 17 which functions as a source of welding energy.

In order to control the connection of the welding circuit 10 to the condenser 17, the valve means may, for example, comprise a pair of arc discharge devices 20 and 40 connected in inverse relation and controlled by gaseous discharge devices 82 and 83, respectively, in the manner hereinbefore described in connection with Fig. 5. For example, negative bias voltages may be applied to the control grids 88 and 89 of the gaseous discharge devices by means, such as the batteries 90 and 91, to normally render the gaseous discharge devices 82 and 83 non-conductive. In order to render the gaseous discharge devices 82 and 83 selectively conductive in response to predetermined voltage conditions of the condenser 17, means may be provided for superimposing on the control grids 88 and 89 a voltage proportional to the voltage of the condenser such as, for example, the control resistor 92. As hereinbefore described in connection with Fig. 5, the control voltage will be superimposed on the control grids 88 and 89 by means of the control resistor 92, making one or another of the control grids positive, or reducing the negative bias voltage thereof sufficiently to render the gaseous discharge device conductive, depending on the instantaneous polarity of the voltage across the condenser 17.

In order to provide for connecting the condenser 17 to a suitable source of alternating current, such as, for example, the alternattor 99, suitable switch or valve means may be provided comprising, for example, the inversely connected arc discharge devices 95 and 96, having control electrodes or igniters 97 and 98, respectively.

With a view to connecting the condenser 17 to the source 99 intermittently, or periodically to effect intermittent or periodic welds, suitable timing means, denoted generally by the reference numeral 100, may be provided. The timing means may be of any suitable type adapted to effect a synchronous connection of the condenser 17 to the source 99 and may, for example, comprise substantially the arrangement shown and described in detail in Patent No. 2,081,987, Serial No. 59,402, issued to John W. Dawson on June 1, 1937, and assigned to the Westinghouse Electric & Manufacturing Company, the assignee of this application.

The timing means 100 may, for example, comprise gaseous discharge devices 101 and 102 for selectively applying control voltages to the igniters 97 and 98 of the arc discharge devices 95 and 96 respectively to render them conductive selectively. The gaseous discharge devices 101 and 102 may be provided with control grids 103 and 104, respectively, which may be connected to suitable sources of negative bias voltage such as, for example, the rectifier bridge circuits 105 and 106. Interposed between the sources of bias voltages and the control grids are windings 107 and 108, respectively, which may be positioned on a magnetic core member 109 having an air gap 110 therein. A disk member 112 may be provided having a plurality of pins 113 of magnetic material positioned around the periphery thereof in spaced relation, and adapted to pass through the air gap 110 when the disk 112 is rotated. Suitable means such as the synchronous motor 114, which may be energized from the source 99 may be provided for driving the disk 112.

Rotation of the disk effects variations in the magnetic reluctance of the air gap 110, inducing voltage pulsations in the windings 107 and 108 which alternately add to and subtract from the negative bias voltages applied to the control grids 103 and 104 by the rectifier bridge circuit 105 and 106. The gaseous discharge devices 101 and 102 may thus be rendered conductive periodically or intermittently by means of the positive voltage impulses at any suitable intervals, by varying the spacing of the magnetic pins 113 on the disk 112.

In order to control the particular point in the different cycles, at which the arc discharge devices 95 and 96 are rendered conductive, phase control means denoted, generally, by the numeral 116 may be provided. For example, gaseous discharge devices 117 and 118 having control grids 119 and 120, respectively, may be utilized to shunt control resistors 121 and 121a which normally limit the current to the igniters 97 and 98 of the arc discharge devices 95 and 96, respectively, to prevent the gaseous discharge devices 101 and 102 from rendering them conductive until predetermined variable points in each cycle for which the gaseous discharge devices 101 and 102 are rendered conductive.

The gaseous discharge devices 117 and 118 may, for example, be controlled by applying suitable bias voltages to the control grids 119 and 120 through control transformers 122 and 123, respectively. In order to provide for varying the phase of the voltages applied to the control transformers 122 and 123 with respect to the voltage of the source 99, a phase shifting circuit 124 may be provided. The phase shifting circuit 124 may be energized from a transformer 125 connected to the source 99 and having a secondary winding 127 provided with a center tap 128. An impedance network may be provided by connecting a voltage divider resistance 130 across the secondary winding 127, and connecting an impedance 131 across a portion of the resistance. The phase shifting circuit 124 may be connected to the control transformers 122 and 123 by means of a variable tap 132 on the resistance 130 and a variable tap 134 connected between the center tap 128 of the control transformer 125 and a balancing resistance 136 connected between the control transformers 122 and 123.

By connecting a suitable inductance 138 between the source 99 and the condenser 17 having an inductive impedance equal to approximately one-half of the capacitative impedance of the condenser 17, an oscillatory charging circuit may be provided for the condenser 16, as illustrated by the voltage curves of Fig. 6. By thus selecting the value of the impedance 138 with respect to the condenser 17, there will be produced a component of the condenser charging current having a frequency equal to the square-root of two times the frequency of the source. Under these conditions, as shown by the curves in Fig. 6, the resultant condenser voltage will have a frequency differing from the voltage of the source, and will reach successively higher peak values until a maximum is attained on the third half cycle after the condenser is connected to the source. Since the values and the manner of fluctuation of the condenser voltage relative to the voltage of the source vary, depending on the point at which the condenser is connected to the source with respect to the voltage wave of the source, it will be seen that the phase shifting means 116 is important in securing the proper relations between the condenser and source voltages to achieve the desired conditions.

By properly selecting the relative values of the negative bias voltages applied to the control grids 88 and 89 of the gaseous discharge devices 82 and 83, and the voltages applied thereto by the control resistor 92 in response to the instantaneous voltage of the condenser 17, it will be possible to effect selective conductivity of the arc discharge devices 20 and 40 so as to initiate the welding operation only on the odd half-cycles of the condenser voltage, as described in connection with Figs. 5 and 6. By thus spacing the welding impulses, intermittent high frequency welding impulses may be effected without producing any direct current component in either the charging or the welding circuit. By varying the phase relation, the energy charge of the condenser may be varied and heat control of the welding operation obtained. Also the effects of the relatively high frequency condenser discharges on the source may be minimized by connecting the condenser to the welding circuit at a point near the zero point of the voltage wave of the source.

Figures 8, 9:
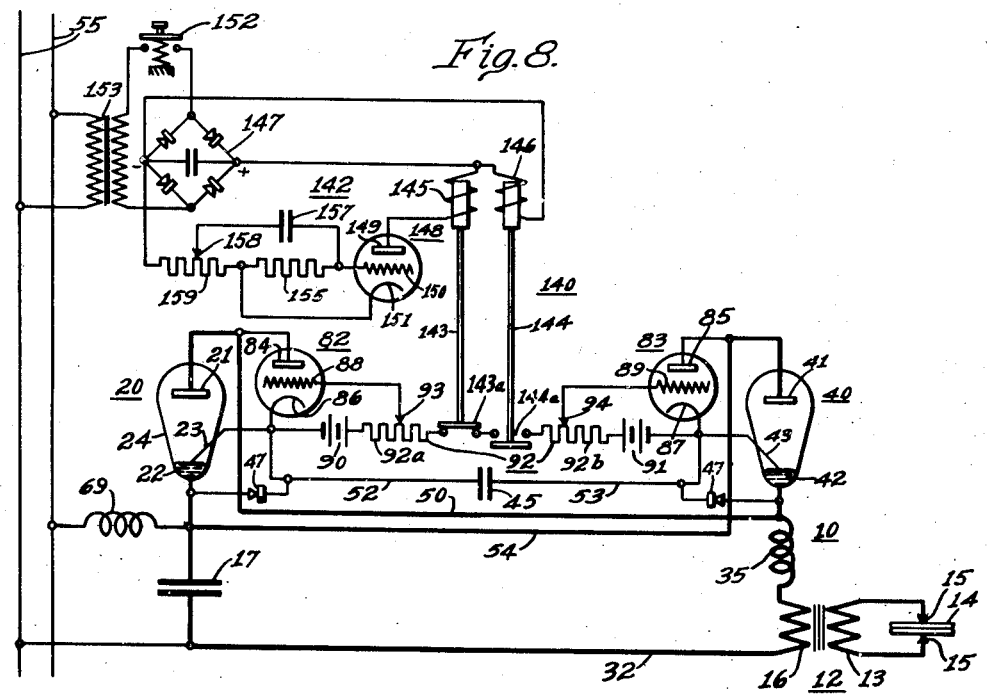
Fig. 8 is a diagrammatic view of a spot or seam welding system embodying the principal features of the invention.
Fig. 9 is a diagrammatic view of a welding system embodying a yet further modification of the invention.

Referring to Fig. 8 of the drawings, the reference numeral 10 may, as heretofore, denote, generally, a welding circuit which may be connected to the condenser source of welding energy 17 by switch means 140 for effecting welding operations of varying durations. The condenser 17 may be connected for charging to the conductors 55 which may be connected to a suitable alternating current source.

The switch means 140 may comprise a pair of inversely connected valves or arc discharge devices 20 and 40 controlled by gaseous discharge devices 82 and 83, respectively, which may be normally rendered non-conductive by means of negative bias voltages applied to the control grids 88 and 89 thereof by means such as batteries 90 and 91, in the manner hereinbefore described in connection with Figs. 5 and 7. A control resistor 92 may be provided as therein described for superimposing on the control grids 88 and 89 positive voltages effective to reduce the negative bias voltages to sufficiently low values to render the discharge devices 82 and 83 conductive selectively. For a purpose hereinafter set forth, the resistor 92 may comprise separate sections 92a and 92b, instead of a single section as in Fig. 5.

In order to provide for rendering the discharge devices 82 and 83 conductive only for predetermined timed intervals, which may be selected by the operator, suitable timing means 142 may be provided for controlling the connection of the resistor sections 92a and 92b. For example, switch devices 143 and 144 may be provided, having normally closed and normally opened contact members 143a and 144a between the sections 92a and 92b, and operating windings 145 and 146, respectively. The operating winding 146 may be connected to the rectifier bridge circuit 147 directly, while the operating winding 145 may be connected thereto in series circuit relation with a control valve 148 having an anode 149, a control grid 150 and a cathode 151, which may be energized from any suitable source of electrical energy. A control switch 152 may be provided for connecting the rectifier bridge circuit 147 to a suitable source of alternating current to initiate a welding operation, such as, for example, the control transformer 153, which may be connected to the conductors 55.

In order to provide for a predetermined timed welding interval, the control grid 150 of the control valve 148 may be connected to the rectifier bridge circuit through a resistor 155 which provides a negative bias voltage between the control grid 150 and the cathode 151 so long as current flows through the resistor 155. A condenser 157 may be provided for controlling the duration of current flow through the resistor 155 being, for example, connected in shunt circuit relation therewith by means of a movable contact 158 and a control resistance 159.

When the control switch 152 is closed, the rectifier bridge circuit 147 is immediately energized and the control switch 144 operates, closing contact members 144a to connect the sections 92a and 92b of the control resistor 92 between the control electrodes or igniters 23 and 43 of the arc discharge devices 20 and 40, so that the voltage of the condenser 17 is impressed thereon. A voltage proportional to the voltage of the condenser 17 is thereby superimposed on the control grids 88 and 89 through the contact members 93 and 94 in the manner heretofore described in connection with Fig. 5, and the arc discharge devices 20 and 40 may be rendered conductive in response to predetermined voltage conditions of the condenser 17.

As soon as the rectifier bridge circuit 147 is connected to the source, plate voltage is applied to the plate 149 of the valve 148, and a limited current flows through the circuit from the positive terminal of the bridge circuit, operating winding 145 of the control switch 143, plate or anode 149 of the valve device 148, cathode 151, and control resistance 159 to the negative terminal of the rectifier bridge. A voltage is thus produced across the resistor 159 which charges the condenser 157 through the resistor 155, making the cathode 151 positive with respect to the control grid 150, which prevents the valve 148 from passing sufficient current to operate the control switch 143.

As soon as the condenser 157 becomes charged, the current flow through the control resistor 155 ceases, and the negative bias voltage on the control grid 150 is removed. The control valve 148 then becomes sufficiently conductive to operate the control switch 143, opening contact members 143a to disconnect the sections of the control resistance 92 and remove the voltage of the condenser 17 from the control grids 88 and 89. The gaseous discharge devices 82 and 83 are thus returned to the non-conductive state, terminating the welding operation.

Referring particularly to Fig. 9, it will be seen that the welding circuit 10 is disposed to be connected to the condenser 17 by a pair of inversely connected arc discharge devices 20 and 40 under the control of gaseous discharge devices 82 and 83 arranged in a manner similar to that hereinbefore described in connection with Figs. 5, 7 and 8.

In order to control the conductivity of the gaseous discharge devices 82 and 83 to initate welding operations, suitable means may be provided for normally applying alternating current bias voltages to the control grids 88 and 89 thereof, which are negative with respect to the condenser voltages on their respective arc discharge devices. For example, a control transformer 160 may be provided, having a primary winding 161 connected to the source of alternating current from which the condenser 17 is energized and secondary windings 162 and 163 which may be connected between the cathodes 86, 87 of the gaseous discharge devices and the respective control grids 88, 89 thereof. With a view to varying the point with respect to the voltage wave of the source at which the gaseous discharge devices 82 and 83 are rendered conductive, variable contact members 165 and 166 may be provided for changing the voltages applied to the control grids 88 and 89 from the secondary windings 162 and 163, respectively.

In order to control the conductivity of the gaseous discharge devices 82 and 83, selectively in response to the high frequency oscillations produced in the discharge circuit between the condenser 17 and the primary winding 16 of the welding transformer 12, subsequent to the initiation of a welding operation by either of the gaseous discharge devices 82 or 83, suitable means may be provided for applying control bias voltages to the control grids 88 and 89 independently of the source. For example, an auxiliary variable condenser 167 and a control resistor 168 may be connected by means of movable contacts 169 and 170 to control resistors 171 and 172 in the grid circuits to provide a relatively low impedance path between the cathodes 22 and 42 for the relatively high frequency oscillations produced in the discharge circuit, and apply bias voltages to the control grids 88 and 89 to render the discharge devices 82 and 83 selectively conductive in response to variations of voltages in the discharge circuit. A low pressure gap device 173 may be connected between the control grids 88 and 89 to act as a protective device for the circuit and bypass any excessively high voltage surges which may be introduced into the control grid circuits.

Figure 10:
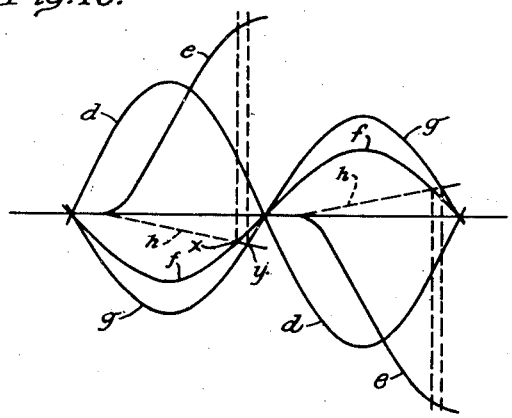
Figs. 10 and 11 show voltage curves illustrating the operation of the welding system of Fig. 9.

I claim:
Referring to Fig. 10, the curve d represents the voltage wave of the source of the system of Fig. 9, while the curve e represents the voltage of the condenser 17 which is connected to the source for charging. The curves f and g represent different values of negative bias voltage applied to the one or another of the control grids 88 or 89 by the secondary windings 162 or 163 of the control transformer 160. The curve h represents the minimum value of negative bias voltage with respect to the condenser voltage e which is effective to render either of the gaseous discharge devices 82 or 83 non-conductive. It will be seen that whenever the condenser and source voltages are positive with respect to either of the discharge devices 82 or 83, the bias voltages are negative and normally prevent the devices from conducting. When the curves f and g intersect the curve h, the gaseous discharge device 82 or 83 is rendered conductive to initiate a welding operation. By adjusting the movable contact members 165 and 166 to vary the value of the bias voltage applied to the control grid 88 or 89, as represented by the curves f and g, the points of intersection x and y of the negative bias voltages with the minimum negative bias voltage curve h may be changed, so as to occur at different intervals with respect to the horizontal or time axis. Accordingly, the point at which the arc discharge devices 20 and 40 are rendered conductive may be varied with respect to the source and condenser voltage waves illustrated by the curves d and e by varying the negative bias voltages applied to the control grids 88 and 89.

Figure 11:
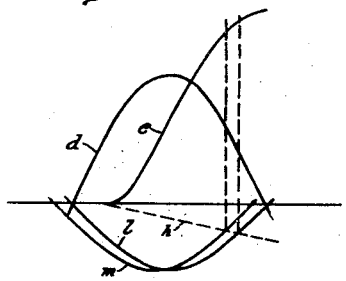

Referring to Fig. 11, the curve e denotes the condenser voltage wave, while the curve d indicates the voltage wave of the source. The curves l and m indicate different conditions of negative bias voltages applied to the control grids 88 or 89 from the secondary windings 162 or 163 of the control transformer 160 under different predetermined conditions. By varying the current through the condenser 167 and making the condenser 167 sufficiently large and the resistors in series therewith sufficiently small, an appreciable voltage drop in the grid resistances 171 and 172 may be produced during the charging period of the condenser 167 through the circuit extending from the igniter 23 through conductor 174, secondary winding 162, contact member 165, resistor 171, contact member 169, condenser 167, resistor 168, contact member 170, resistor 172, contact member 166, secondary winding 163, and conductor 175 to igniter 43. The condenser current being a leading current, the voltage drop produced in the grid resistors 171 and 172 thereby will be out-of-phase with the voltage of the secondary winding 162 or 163. Accordingly, the resultant bias voltage indicated by the curve m, which illustrates the bias voltage when the condenser 167 is relatively large, will be out-of-phase with the normal bias voltage produced by voltage secondary winding 162 or 163, denoted by the curve l. As a result, the intersection of the negative bias voltage with the minimum bias voltage curve h will be advanced by increasing the capacity of the condenser 167. The point at which the gaseous discharge devices 82 and 83 are rendered conductive with respect to the condenser voltage wave e may thus be altered. Phase control of the firing points of the arc discharge devices 20 and 40 with respect to source or the condenser voltage wave may thus be obtained by either adjustment of the movable taps 165 and 166, the size of the condenser 167, or of the movable taps 169 and 170.

During the discharge period, current from the supply flows from the source through the arc discharge devices 82 and 83, adding algebraically to the current oscillations in the discharge or welding circuit. It may happen that, when the high frequency oscillations in the discharge circuit are dying out, there is insufficient potential across the condenser 17 to permit the current in the arc discharge devices to drop to zero and allow them to deionize. The supply current may continue to flow in the inductive discharge circuit and may not reverse until late in the next half cycle. The condenser 17 remains connected to the welding or discharge circuit and is partially short-circuited, so that it cannot charge properly on the succeeding half cycle. Or sufficient grid bias voltage may be produced to permit one or the other of the gaseous discharge devices to conduct and render one or the other of the arc discharge devices conductive prematurely.

In order to prevent the occurrence of such conditions, the system of Fig. 9 may be modified to insure the gaseous discharge devices and arc discharge devices being rendered non-conductive whenever the condenser voltage drops below a predetermined value.

Figure 12:
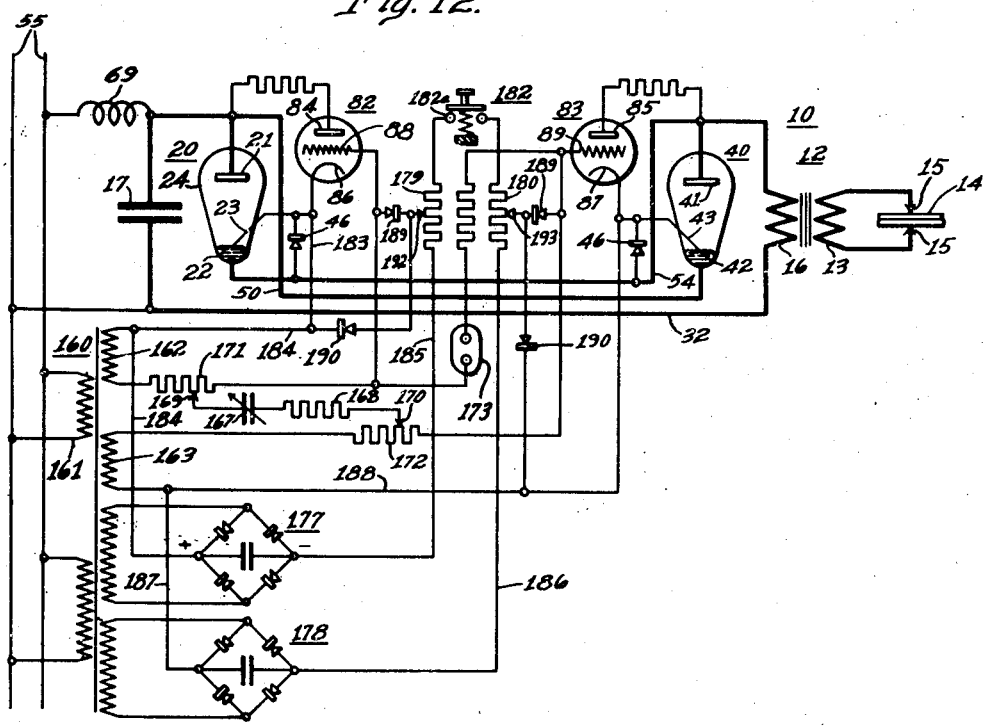
Fig. 12 illustrates diagrammatically still another modification of the invention embodied in a welding system.

Referring to Fig. 12, it will be seen that the arrangement of the arc discharge devices 20 and 40 for connecting the welding circuit 10 to the condenser 17 is substantially the same as shown in Fig. 9. In order to provide for insuring that the gaseous discharge devices 82 and 83 will be rendered non-conductive as soon as the voltage in the discharge circuit of the condenser 17 drops to a predetermined value, regardless of the bias voltages produced by the control transformer 160, suitable means, such as the rectifier bridge circuits 177 and 178 may be provided for applying fixed negative bias voltages to the control grids 88 and 89, respectively, to render them negative when the voltages applied thereto from resistors 179 and 180 proportional to the condenser voltage are below a desired value so that the gaseous discharge device will be maintained non-conductive on any condenser voltage below that by which they may be readily controlled. Means, such as the switch 182, may be provided for connecting the resistors 179 and 180 to provide a bias circuit extending from one terminal of the condenser 17 at igniter 23, through conductors 183 and 184, rectifier device 177, conductor 185, resistor 179, contact members 182a, resistor 180, conductor 186, rectifier device 178, conductors 187 and 188 to the igniter 43 and the other terminal of the condenser 17. Rectifier devices 189 and 190 provide unidirectional shunts to connect the grids 88 and 89 to contact members 192 and 193 of the resistors 179 and 180, respectively, whenever the voltage of the condenser 17 drops below the predetermined value in any cycle. Regardless of the bias voltages applied to the grids by the secondary windings 162 and 163 in any half cycle of the source voltage wave, the voltage of the grids cannot be greater than the voltages at the contact members 192 and 193, and will be negative when these voltages drop below the predetermined value.

Figure 13:
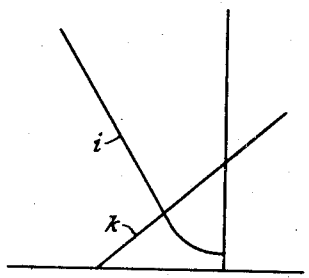
Fig. 13 shows voltage curves illustrating the operation of the system shown in Fig. 12.

Referring to Fig. 13, the curve k denotes the variation in the voltage of the contact members 192 and 193 with the condenser voltage, while the curve i represents the minimum negative grid voltage necessary to prevent the gaseous discharge devices from becoming conductive, for different values of condenser voltage. The devices conduct at points above and to the right of the curve i, but in the system of Fig. 12 points below and to the right of the curve i do not exist. The intersection of the two curves, therefore, represents the lowest value of condenser voltage at which the gaseous discharge devices can be rendered conductive, which point may be varied by adjustment of the movable contact members 192 and 193. If the grid voltage tends to become positive at low condenser voltages, the rectifiers 189 and 190 conduct and lower the grid voltage to that at the movable contact 192 or 193. The devices 82 and 83 are under these conditions rendered non-conductive, regardless of the bias voltages produced by the secondary windings 162, 163, so that the condenser 17 is disconnected from the welding circuit 10 and recharges from the source.

Figure 14:
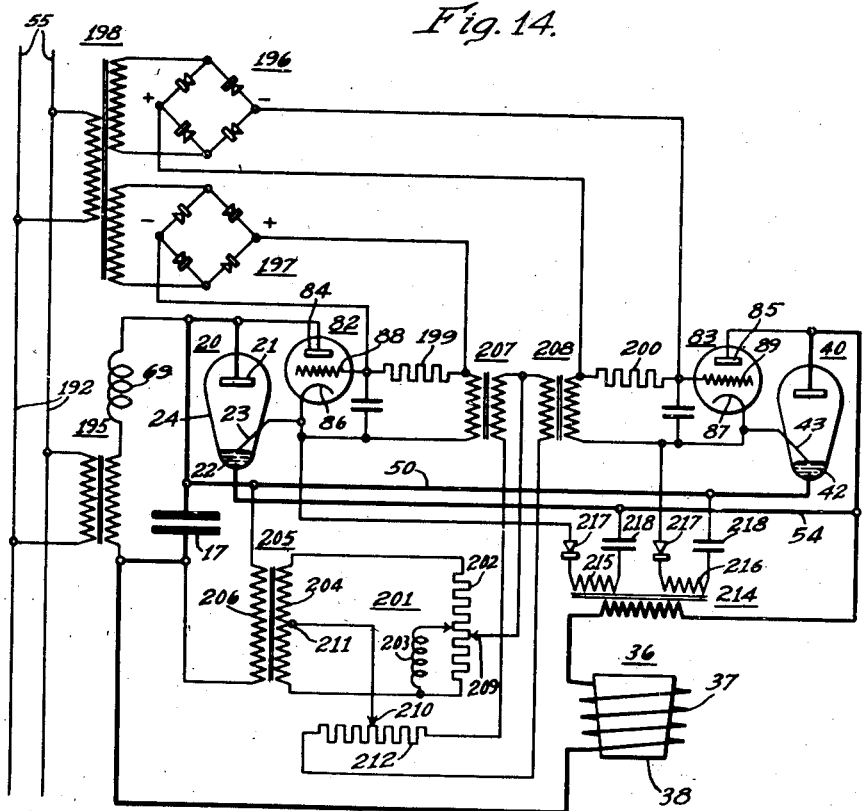
Fig. 14 is a diagrammatic view of an induction heating system embodying a yet further modification of the invention.

Referring to Fig. 14, the reference numeral 36 denotes, as heretofore, a load, comprising, for example, induction heating apparatus including an induction coil 37 and a cupola 38, which is disposed to be connected to a condenser 17, connected to a suitable source of alternating current energy by means of a current limiting charging impedance 69, a transformer 195, the conductors 55.

A pair of inversely connected arc discharge devices 20 and 40 controlled by gaseous discharge devices 82 and 83, respectively, are disposed to control the connection of the condenser 17 to the induction coil 37. In order to provide for normally rendering the gaseous discharge devices 82 and 83 non-conductive, suitable means may be provided for applying negative bias voltages to the control grids 88 and 89 thereof, such as, for example, the rectifier bridge circuits 196 and 197 which may be energized from the conductors 55 through a suitable control transformer 198, and grid resistors 199 and 200, respectively.

In order to provide for rendering the discharge devices 82 and 83 conductive and varying the point at which they are rendered conductive with respect to the voltage wave of the condenser 17, suitable means, such as the phase-shifting circuit 201, may be provided for applying alternating current bias voltages to the control grids 88 and 89 to overcome the negative bias voltages applied thereto by the rectifier bridge circuits 196 and 197. The phase-shifter circuit 201 may, for example, comprise an impedance network including a resistor 202 having an impedance 203 connected in shunt circuit relation with a portion thereof and connected across the secondary winding 204 of a transformer 205, the primary winding 206 of which may be connected across the condenser 17. Means, such as the control transformers 207 and 208 may be connected between a movable tap 209 on the control resistor 202 and an adjustable tap 210 connected to a center tap 211 of the secondary winding 204 and engaging a balancing resistor 212 to impress bias voltages on the control grids 88 and 89 in response to variations of the condenser voltage.

In order to provide for maintaining the gaseous discharge devices 20 and 40 conductive after a current impulse has been initiated, suitable menas may be provided for applying control voltages to the igniters 23 and 43, thereof, such as, for example, the current transformer 214 which may be provided with secondary windings 215 and 216, respectively, connected between igniters and cathodes of the arc discharge devices 20 and 40, respectively. Means, such as the rectifier devices 217, may be provided in series circuit relation with the secondary windings 215 and 216 to prevent reverse voltages being applied to the igniters of the arc discharge devices. Condensers 218 may be provided to regulate the time or phase relation of the current to the igniters.

The welding circuit illustrated in Fig. 14 functions generally in a manner similar to the other heating and circuits hereinbefore described. The negative bias voltages applied to the control grids 88 and 89 from the rectifier bridge circuits 196 and 197 normally render the gaseous discharge devices non-conductive. When the condenser voltage reaches a predetermined value, voltage impulses are superimposed on the control grids through the phase-shifting circuit 201, the control transformers 207 and 208, which are sufficient to render the gaseous discharge devices selectively conductive depending on the polarity of the voltages applied. When either of the arc discharge devices, for example, the device 20, is rendered conductive by its associated gaseous discharge device, the condenser 17 is discharged through the induction coil 37, setting up a relatively high frequency oscillating current therein. Subsequent firing of the arc discharge devices 20 and 40 is effected by voltages applied to the igniters 23 and 43 from the control transformer 214 in response to the flow of a high frequency current through the induction coil 37 from the condenser 17, thus providing a relatively high frequency oscillating heating current in the material in the cupola 38. The initiating point of the arc discharge devices may be varied with respect to the voltage wave of the condenser 17 by means of the phase-shifting circuit 201, as desired.

From the above description and the accompanying drawings, it will be realized that we have provided in a similar and effective manner for producing relatively high frequency oscillating welding or heating currents by selectively connecting a condenser, which is connected to a suitable source of electrical energy, to a welding or heating circuit. Relatively large amounts of heat energy may thus be produced by the discharge of the condenser in a relatively short period. Since the condenser is connected to the source through an impedance which limits the flow of current from the source, little or no energy is supplied to the load circuit directly from the source. Substantially no fluctuations in the source system are produced when the welding circuit is connected to the condenser in the manner we have described. Where the invention has been described as suitable for producing a plurality of relatively high frequency oscillatory discharges for each charging of the condenser 17 from the source, as in the systems shown in and described in connection with Figs. 3, 4, 5, 7, 8, 9, it will be apparent that these systems may also be used for supplying only a single discharge impulse for each charging of the condenser 17 from the source, by merely omitting the auxiliary capacitor 45 and making the gap devices 60 and 173 such that they will not break down at the lower value of voltage to which the condenser 17 may recharge due to the oscillatory nature of the discharge circuit, as is clearly described in connection with the system of Fig. 3.

The principles of our invention may also be applied to arc welding. In such an event, the material to be welded and the welding electrode are connected to the terminals to which the primary of the welding transformer is connected in the various illustrated embodiments of our invention (e. g., the Fig. 5 modification). In addition, an impedance, such as a capacitor or a resistor, is connected across the terminals to prevent the discharging network for the capacitor from becoming electrically isolated from ground when the welding arc breaks.

Since certain changes may be made in the above description and different embodiments of the invention may be made, without departing from the spirit thereof, it is intended that all the matter contained in the above description or shown in the accompanying drawings shall be considered as illustrative and not in a limiting sense.

We claim as our invention:

1. A power system comprising, a condenser, a resonant charging circuit connecting the condenser to a source of electrical energy to produce an oscillating charging current of a relatively low frequency, a separate discharging circuit including an inductive load device, valve means having control electrode means operable to connect the discharging circuit to the condenser to produce a relatively high frequency oscillatory discharge of the condenser through the inductive load device, and means including a control circuit energized in accordance with the charge of the condenser to control the energization of the control electrode means for controlling the operation of the valve means.

2. An energy translating system comprising, an inductive load device, a condenser for supplying relatively high frequency impulses of electrical energy to the load device, circuit means connecting the condenser to a source of relatively low frequency alternating current including an inductance to provide an oscillatory charging circuit having successively increasing peak voltages in excess of the source voltage, and valve means having a control electrode energized in response to a predetermined condenser voltage in excess of the source voltage operable to connect the condenser to the load device at spaced intervals.

3. Apparatus for supplying relatively high frequency electrical energy to an inductive load circuit comprising, a condenser, circuit means connecting the condenser to a source of electrical energy, a pair of inversely connected arc discharge devices having control electrodes operable to connect the condenser to the load circuit, and control means including control valve means energized from the condenser adjustable for applying different control voltages to one of the control electrodes to render its associated arc discharge device conductive at different predetermined points in the condenser voltage wave.

4. The combination with an inductive load circuit and a condenser connected to a source of electrical energy, of a pair of inversely connected arc discharge devices having control electrodes for rendering the devices conductive connected in series circuit relation with the condenser and load circuit, a low pressure discharge gap device connected to apply an initiating voltage to the control electrode in response to a predetermined condenser voltage, and an auxiliary condenser connected to apply a relatively high frequency control voltage to the control electrode from the load circuit to render the devices conductive in response to oscillations in the load circuit.

5. A switching system for a relatively high frequency load circuit including a source of electrical energy, a condenser connected thereto for energization and an inductive circuit device comprising, a pair of inversely connected gaseous discharge devices having control electrodes to render them conductive connected between the condenser and the inductive circuit device in back-to-back relation, circuit means for applying a voltage to the electrodes in response to a predetermined condenser voltage to initiate the conductivity of one of the devices, and control means including an auxiliary condenser connected to provide a control voltage to the control electrodes in response to relatively high frequency oscillations in the load circuit to render them conductive after the load circuit has been connected to the condenser.

6. The combination with a condenser connected to a source of electrical energy and an inductive load circuit, of bi-directional valve means having control electrodes operable to connect the inductive load circuit to the condenser, circuit means for applying a control voltage to the control electrodes in accordance with a predetermined condition of the condenser to set up high frequency oscillations between the condenser and the load circuit, and means including a condenser connected between the control electrodes to provide a relatively low impedance energizing circuit for applying the relatively high frequency voltage to the control electrodes.

7. The combination with an inductive load circuit and a condenser disposed to be energized from a source of electrical energy, of impedance means to limit the flow of energy from the source, a valve means for connecting the condenser to the load circuit, control means operable to apply a control voltage to the valve means, and means responsive to the rate of charging of the condenser for rendering the said control means inoperative until the condenser voltage reaches a predetermined value.

8. An intermittent load energizing system comprising a condenser source of current, circuit means including inductance for connecting the condenser to a source of alternating current of relatively low frequency to provide an oscillatory charging circuit having successively increasing peak voltages, a load circuit including sufficient inductance to provide a relatively high natural circuit frequency, arc discharge means operable to connect the load circuit to the condenser, control means for said arc discharge means, circuit means for applying a control voltage to the control means in response to the condenser voltage to render the arc discharge means selectively conductive, said circuit means being capable of adjustment to render the arc discharge means conductive only in response to predetermined condenser peak voltages higher than preceding voltage peaks to effect timed discharges of the condenser, and means for varying the point on the voltage wave of the source at which the condenser is connected to the source.

9. A power system comprising, a condenser source of electrical energy connected to a source of alternating current, an inductive load circuit, inversely connected arc discharge valve means having control electrodes operable to connect the load circuit to the condenser, gaseous discharge means operable to apply control voltages to the control electrodes to render the arc discharge valve means conductive, control means for the gaseous discharge means, circuit means for applying alternating-current bias voltages to the said control means in opposition to the condenser voltage applied to the associated arc discharge valve means, means to vary the bias voltages to initiate conductivity of the arc discharge means at different predetermined points in the condenser voltage wave, and an auxiliary condenser connected between the control means to render the gaseous discharge means conductive in response to relatively high frequency oscillations in the load circuit.

10. A power system comprising, a load circuit including a predetermined amount of inductance, a condenser, circuit means for connecting the condenser to a source of electrical energy for charging, arc discharge valve means for connecting the load circuit to the condenser to effect a rapid discharge thereof and produce relatively high frequency oscillations in the load circuit, control means for the arc discharge valve means, circuit means to apply a control voltage to the control means to render the valve means conductive, and an auxiliary condenser connected to apply a relatively high frequency control voltage to the control means from the welding circuit to render the valve means conductive subsequent to initiation in a given half cycle of the source voltage wave.

11. An impulse energy system comprising, a condenser, an oscillatory charging circuit having an inductive impedance approximately one half the impedance of the condenser for connecting the condenser to a relatively low frequency source of electrical energy, a load circuit containing a predetermined amount of inductance to provide a relatively high natural circuit frequency and produce an oscillatory discharge of the condenser at a relatively high frequency, a pair of inversely connected arc discharge devices for connecting the load circuit to the condenser, said devices having control electrodes for rendering the devices conductive, control means responsive to a predetermined condenser voltage to energize one of the control electrodes to render its associated arc discharge device conductive, and circuit means including an auxiliary condenser connected to the load circuit to pass a relatively high frequency control current for subsequently rendering the arc discharge devices conductive.

12. The combination with a condenser source of stored energy disposed to be charged from a suitable source of electrical energy and an inductive load circuit, of a pair of arc discharge valve means provided with control electrodes and arranged in back-to-back relation to connect the condenser to the load circuit, circuit means for applying a control voltage to the control electrode of one of the valve means to initiate the connection of the load circuit to the condenser in predetermined relation to the condenser voltage wave to produce a relatively high frequency load current, means for producing a relatively high frequency control voltage bypass between the control electrodes to selectively render the valve means conductive alternately during the remainder of the half cycle of the condenser voltage wave, and circuit means to render the valve means non-conductive when the condenser voltage reaches a predetermined minimum value.

13. A switching system for connecting a condenser disposed to be charged from a suitable source of electrical energy to a load circuit having a relatively high natural frequency comprising, valve means connected between the condenser and the load circuit, control means for the valve means, means for applying restraining voltages to the control means to render the valve means non-conductive, circuit means for applying to the control means a voltage proportional to the voltage of the condenser to initially render the valve means conductive under predetermined conditions, and an auxiliary condenser for supplying a relatively high frequency control voltage to the control means subsequent to the valve means being initially rendered conductive to effect selective connection of the load circuit to the condenser during the remaining portion of the half cycle in which the connection was initiated.

14. The combination with a stored energy device connected to be charged from a source of alternating current and valve means having control means for controlling the connection of the stored energy device to a load device to provide a load circuit having a relatively high natural frequency, of means for applying an alternating-current bias voltage to the control means from the source to render the valve means non-conductive until a predetermined point relative to the voltage wave of the source, and means to vary the point at which the valve means is rendered conductive.

15. In combination with valve means having control means to render the valve means conductive to connect a load circuit having a relatively high natural frequency to a condenser source of stored electrical energy energized from a relatively low frequency source of alternating current, of circuit means for applying an alternating-current bias voltage to the control means to prevent the valve means for becoming conductive until a predetermined point in a given half cycle, and an auxiliary condenser to vary the phase of the bias voltages relative to the voltage of the source.

16. The combination with a load circuit having a relatively high natural frequency and a pair of unidirectional valve devices with control means in inverse relation for connecting the load circuit to a source of stored electrical energy, of control means provided with control electrodes operable to effect the energization of the control means to render the valve devices selectively conductive, circuit means for applying bias voltages to the control electrodes in opposition to the voltages applied to the respective valve means from the source to maintain the valve means selectively non-conductive until predetermined points of the voltage wave, and means including an auxiliary condenser connected to provide a relatively low impedance path through the circuit means for a relatively high frequency control current from the load circuit to render the control means selectively conductive in response to relatively high frequency oscillations produced in the load circuit when the connection of the load circuit to the source is initiated.

17. The combination with valve means having control means energizable to render the valve means conductive to connect a condenser disposed to be changed from a relatively low frequency source of electrical energy through a current limiting impedance to a load circuit having a relatively high natural frequency of oscillation, of control valve means having control electrodes to control the energization of the control means, means for applying alternating-current control voltages to the control electrodes responsive to the voltages applied to their respective valve means but of opposite phase, circuit means for applying control voltages to the control electrodes in response to the condenser voltage and in generally the same phase relation therewith, additional circuit means for applying substantially constant negative bias voltages to the control electrodes, and unidirectional current means connecting the control electrodes to the said circuit means to provide one way shunts to reduce voltage on the control electrode to a predetermined value to deenergize the control means whenever the condenser voltage reaches a predetermined minimum value.

18. Converting apparatus comprising a capacitor, an inductor, means for charging the capacitor, a pair of electric discharge valves each having a pair of main electrodes and a control electrode connected with the main electrodes in anti-parallel between the capacitor and the inductor for discharging the capacitor through the inductor, and circuit means effecting energization of the control electrodes in accordance with the capacitor voltage.

19. Converting apparatus comprising a capacitor, an inductor, periodic current means connected for charging the capacitor to successively opposite polarities, and a pair of electric discharge valves each provided with a pair of main electrodes connected in anti-parallel between the capacitor and the inductor for discharging the capacitor through the inductor, said capacitor, inductor and valves constituting a series tuned network tuned to a frequency substantially higher than that of said periodic current means.

20. For use for supplying current to the primary of a transformer having a load circuit interposed in the secondary, a condenser, circuit means connecting the condenser to a source of current for alternately charging the condenser to opposite polarities from the source, and additional circuit means including a pair of electric discharge valves interposed in anti-parallel between said condenser and said primary to provide an oscillatory discharge of said condenser.

21. Converting apparatus comprising a capacitor, an inductor, means for charging the capacitor, a pair of electric discharge valves each having a pair of main electrodes and a control electrode connected in anti-parallel between the capacitor and the inductor for discharging and recharging the capacitor repeatedly through the inductor, and an auxiliary capacitor connected between the control electrodes to provide an energizing circuit.

22. A control circuit for valve means having control means to render the valve means conductive to connect a load circuit to a condenser source of stored electrical energy energized from a relatively low frequency source of alternating current comprising, circuit means for applying a bias voltage to the control means to render the valve means non-conductive until a predetermined point in the voltage wave of the source, and control means associated with the circuit means for varying the point in the voltage wave of the source at which the valve means is rendered conductive.

23. Converting apparatus comprising, a capacitor, an inductor, means for charging the capacitor, a pair of electric discharge valves each having aa pair of main electrodes connected in anti-parallel between the capacitor and the inductor and a control electrode energizable to render the valve conductive for discharging the capacitor through the inductor, and means for effecting energization of one of the control electrodes only when the voltage of the capacitor reaches at least a predetermined value.

24. In a system for supplying power to a reactive load circuit, the combination of an energy storage device chargeable to either of two opposite polarities, circuit means coupling said device to said circuit so as to enable the device when charged to either polarity to supply energy to the circuit and to enable reactive energy stored in the circuit to be returned and partially recharge the device to the opposite polarity, and additional circuit means coupling said device to a source of alternating current power so as to complete the recharging thereof to either of said opposite polarities.

25. In a system for supplying power to a reactive load circuit, the combination of an energy storage device chargeable to either of two opposite polarities, circuit means coupling said device to said circuit so as to enable the device when charged to either of said polarities to supply energy to the circuit and to enable reactive energy stored in the circuit to be returned to and partially recharge the device to the opposite polarity, and additional circuit means coupling said device to a source of alternating current power so as to complete the recharging thereof to each of said opposite polarities alternately.

26. In a system for supplying power to a load circuit, an energy storage device, means for supplying charging current to the device, means for completing a discharge circuit from the device through the load circuit, and control means effective if the voltage of the device is at or above a predetermined value to render the first-mentioned means ineffective and to cause completion of said discharge circuit.

27. For use in supplying electrical energy to a load circuit connected in the secondary circuit of a transformer having a primary circuit, a condenser, circuit means connecting the condenser to a relatively low frequency source of alternating current for charging to opposite polarities in accordance with the alternating polarity of the source frequency, and means including a pair of inversely connected electrode-controlled valve devices for connecting the condenser to the primary circuit of the transformer in accordance with a predetermined condition of charge of the condenser in any one half cycle of charging for discharging the condenser through the primary circuit within said half cycle of the source frequency.

JOSEPH SLEPIAN.
ALFRED B. WHITE.

REFERENCES CITED

The following references are of record in the file of this patent:

UNITED STATES PATENTS

| Number | Name | Date |
|---|---|---|
| 966,205 | Hewitt | Aug. 2, 1910 |
| 1,168,346 | Thomson | Jan. 18, 1916 |
| 1,321,438 | Hewitt | Nov. 11, 1919 |
| 1,681,196 | Rudenberg et al. | Aug. 21, 1928 |
| 1,980,899 | Bedford | Nov. 13, 1934 |
| 2,085,100 | Knowles et al. | June 29, 1937 |
| 2,088,490 | Slepian | July 27, 1937 |
| 2,106,831 | Dawson | Feb. 1, 1938 |
| 2,145,724 | Horsley | Jan. 31, 1939 |
| 2,147,472 | Ulrey | Feb. 14, 1939 |
| 2,151,749 | Dawson | Mar. 28, 1939 |
| 2,157,925 | Stoddard | May 9, 1939 |
| 2,179,105 | Sidney | Nov. 7, 1939 |
| 2,235,385 | Rava | Mar. 18, 1941 |
| 2,251,877 | Hagedorn | Aug. 5, 1941 |
| 2,269,460 | Klemperer | Jan. 13, 1942 |
| 2,287,540 | Vang | June 23, 1942 |
| 2,294,672 | Livingston | Sept. 1, 1942 |

FOREIGN PATENTS

| Number | Country | Date |
|---|---|---|
| 548,618 | Great Britain | Oct. 16, 1942 |
| 773,888 | France | Sept. 10, 1934 |
| 792,921 | France | Nov. 7, 1935 |
| 173,396 | Germany | July 12, 1906 |